US008396057B2

(12) United States Patent
Nair et al.

(10) Patent No.: US 8,396,057 B2
(45) Date of Patent: Mar. 12, 2013

(54) METHOD AND APPARATUS FOR TRAFFIC REGULATION IN A COMMUNICATION NETWORK

(75) Inventors: Vinod T. Nair, Austin, TX (US); Abhijeet J. Auradkar, Karnataka (IN); Arabinda Bose, Cedar Park, TX (US); Koen J. Van De Weyer, Lokeren (BE)

(73) Assignee: Alcatel Lucent, Paris (FR)

( * ) Notice: Subject to any disclaimer, the term of this patent is extended or adjusted under 35 U.S.C. 154(b) by 154 days.

(21) Appl. No.: 12/972,714

(22) Filed: Dec. 20, 2010

(65) Prior Publication Data

US 2012/0155627 A1 Jun. 21, 2012

(51) Int. Cl.
*H04L 12/66* (2006.01)

(52) U.S. Cl. ........................................ 370/352; 370/229

(58) Field of Classification Search .................. 370/352, 370/229
See application file for complete search history.

(56) References Cited

U.S. PATENT DOCUMENTS

| 6,526,063 B1* | 2/2003 | St-Amand et al. .......... 370/395.5 |
| 2009/0228558 A1* | 9/2009 | Brenner ........................ 709/206 |

* cited by examiner

*Primary Examiner* — Creighton Smith
(74) *Attorney, Agent, or Firm* — S. Wyse

(57) ABSTRACT

A manner of managing selected CPE (customer premises equipment), UE (user equipments), or other subscriber device traffic in a communication system. A management traffic regulator is provided that inspects incoming management traffic from and determines whether it should be forwarded to a server. The determination is made by comparing the type of message to a rules and policy database, which in one embodiment prescribes which messages will be declined if the level of traffic being processed has reached a certain percentage of the systems maximum capacity.

15 Claims, 4 Drawing Sheets

METHOD AND APPARATUS FOR TRAFFIC REGULATION IN A COMMUNICATION NETWORK

TECHNICAL FIELD

The present invention relates generally to the field of communication networks, and, more particularly, to a method and apparatus for regulating management traffic for communications between a subscriber device and one or more network servers.

BACKGROUND

Some introductory information will here be provided. Note, however, that the apparatus, techniques, or schemes described herein as existing or possible are presented only as background for describing the present invention, and no admission is intended thereby that these were heretofore commercialized or known to others besides the inventors.

Selected abbreviations are herewith defined, at least some of which are referred to within the following description of the state-of-the-art and the present invention.
CPE Customer Premises Equipment
DSL Digital Subscriber Line
HTTP Hypertext Transfer Protocol
PSTN Public Switched Telephone Network
TR Technical Report (a Broadband Forum term)
UE User Equipment Modern homes have a great many electronic devices, many of them usable for communications. Some of the communications are conducted via radio connection to an access network located outside of the home, such as a cellular telephone network. Other telephone communications are carried through a telephone wire to a traditional PSTN (public switched telephone network). In many cases, enhanced techniques such as DSL (digital subscriber line) technology are used to increase the data-carrying capacity of the telephone line. This may permit the subscriber to access the Internet or receive television and other video programming. A coaxial cable or fiber-optic cable may also be used to carry similar traffic.

In traditional telephone service, the subscriber's telephone may connect directly to the incoming telephone line. For more advanced services such as Internet access or video programming, and additional device may be needed to provide in interface between the carrier's network and one or more subscriber electronic devices. One common example is an in-home router that facilitates network connections through wired or wireless connections with the electronic devices. Another example is a set-top box that typically allows a network connection to a television set or DVR (digital video recorder). There are other such devices as well and, while many of these devices are located in the homes of subscribers, they could just as easily be used in a business office, school, church, and so on. For convenience these devices can be collectively referred to as subscriber devices.

Subscriber device that may be managed by an external server and, when this is done, there are in addition to data a great many control messages transmitted. The CPE may, for example, notify the management server that it has come on line or that it has completed performing a diagnostic test. Each CPE will also periodically "report in" so that the device manager can confirm that it is still operational. For example, for CPEs communicating with device managers according to a Broadband Forum TR-069 protocol, these messages may be referred to as Inform messages.

Another example is a mobile communications device such as a cell-phone, dongle or other wireless or cellular communications device that is managed remotely according to, for example, the OMA-DM or OMA-CP management protocol. For convenience, these devices can be referred to as UE (user equipment).

Such management communications by be sent routinely and with little problem much of the time. Given the large number of devices under management, however, there may also be times where the number of management messages from subscriber devices can overwhelm the management system. This may occur, for example, after a widespread outage when many CPEs are coming back on line. To prevent system overload, load balancers may be used that, for example, simply limit the number of HTTP applications that may occur. This method has drawbacks, however, such as dropping important messages in favor of low-priority communications. An improved scheme is clearly needed.

Accordingly, there has been and still is a need to address the aforementioned shortcomings and other shortcomings associated with regulating management messages in a subscriber device management system. These needs and other needs are satisfied by the present invention.

SUMMARY

The present invention is directed to a manner of managing selected subscriber device traffic in a communication system. The subscriber device may be, for example, a CPE or UE. In one aspect, the present invention is a method of regulating traffic in a subscriber device management system, including receiving a management message from a subscriber device, inspecting the message to determine at least one characteristic, determining whether to forward the message based at least in part on the at least one characteristic, forwarding the message if it is determined that the message is to be forwarded. The determination is made by comparing the at least one characteristic to rules in a rules and policy database. The method may further include either buffering or declining the message. If the message s buffered it may be considered again later. If the message is declined, a response may be sent indicating that the message was declined. The response may also indicate that the message should be sent again in the future, preferably at a specific time or after a specific delay. Other response messages may reset or revise the management schedule for periodic management message from the subscriber device. The response messages may be generated based on the type of message that is being declined.

In a preferred embodiment, the determination of whether to forward the message is based at least in part on a capacity factor, that is, the portion of the system's maximum capacity that is currently being used. This capacity factor may be calculated whenever a management message is received or calculated periodically and stored in a memory device for reference during the determination process.

In another embodiment, if policy rules permit all messages to be forwarded below a certain capacity factor, then the inspection and determination steps may be omitted until the capacity factor is calculated to have exceeded the threshold value.

In another aspect, the present invention is a traffic regulation device including a processor, a memory device accessible to the processor, a forwarding determiner for inspecting a received management message and determining whether the received management message is to be forwarded, and a rules database for maintaining rules used by the forwarding determiner to determine whether the received management message is to be forwarded. The device may further include a capacity factor calculator for calculating a capacity factor, wherein the forwarding determiner determines whether a received message is to be forwarded based at least in part on the capacity factor.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of managing selected subscriber device traffic in a communication system. The present invention is advantageously implemented, for example, in a system for managing CPEs operating according the Broadband forum TR-069 protocol or UEs operating under the OMA-DM or the OMA-CP protocol, but may be used in other environments as well.

Figure 1:
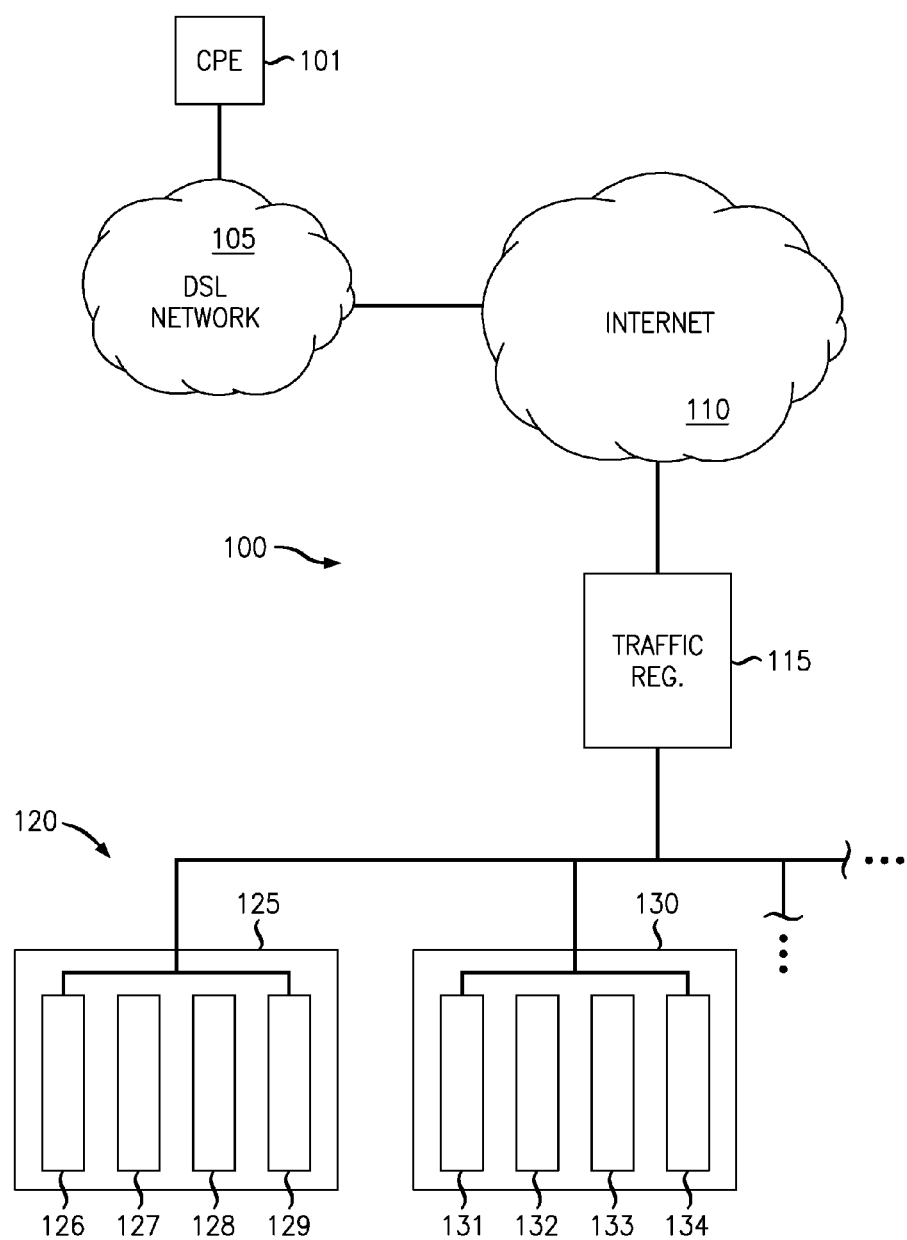
FIG. 1 is a simplified block diagram illustrating selected components of a subscriber device management system according to an embodiment of the present invention.

FIG. 1 is a simplified block diagram illustrating selected components of a CPE management system 100 according to an embodiment of the present invention. CPE (customer premises equipment) 101 is a device for communicating with application servers and other devices via the Internet 110 or a similar packet data network. CPE 101 is typically found in a subscriber's home or small office, though of course with regard to there is no restriction on where the device can be located. In a typical installation CPE 101 accesses the Internet 110 though a DSL network 105 via a gateway (not shown) within the network 105. Note that although only one CPE is shown in FIG. 1, system 100 in implementation typically includes a great many CPE devices.

In the embodiment of FIG. 1, CPE 101 is able to communicate with a collection of servers, which will herein be referred to as server farm 120. Server farm 120 is represented in FIG. 1 as physical server 125 and physical server 130, and of course more servers may be present. Physical servers 125 and 130 in this embodiment each include four managing servers; managing servers 126 though 129 in physical server 125 and managing servers 131 through 134 in physical server 130.

In this embodiment, traffic regulator 115 manages traffic between CPE 101 and server farm 120. Traffic regulator 115 may be, for example, a traffic load and regulation system operable according to the TR-069 protocol. Traffic regulator 115 may perform many functions, but as it relates to the present invention, traffic from CPE 101 directed to the server farm 120 is received and routed to one of the managing servers, for example those depicted in FIG. 1. The traffic regulator 115 ensures that the incoming traffic, or at least that portion of the incoming traffic subject to its management, is distributed properly among the managing servers. Traffic regulator 115 may also perform security and other functions as well.

According to this embodiment, one type of message that may be managed by traffic manager 115 is an Inform message sent according to the TR-069 protocol. There are several types of Inform messages (see, for example, FIG. 2), and they are sent for a variety of reasons. Inform messages may be sent regularly on a periodic basis, or as triggered by a certain event. At times, however, the quantity of such messages can overwhelm the capacity of the server farm 120. According to the present invention, the traffic manager then throttles the flow of Inform messages in an effort to avoid having important messages dropped indiscriminately while at the same time preventing the servers from overload. This process will now be explained in more detail.

In an alternate embodiment (not shown), a UE may communicate thorough a traffic regulator via a RAN or WiFi network. Where different protocols are used for such communications, the traffic regulator simply applies the rules and policies applicable to the types of messages being sent.

Figure 2:
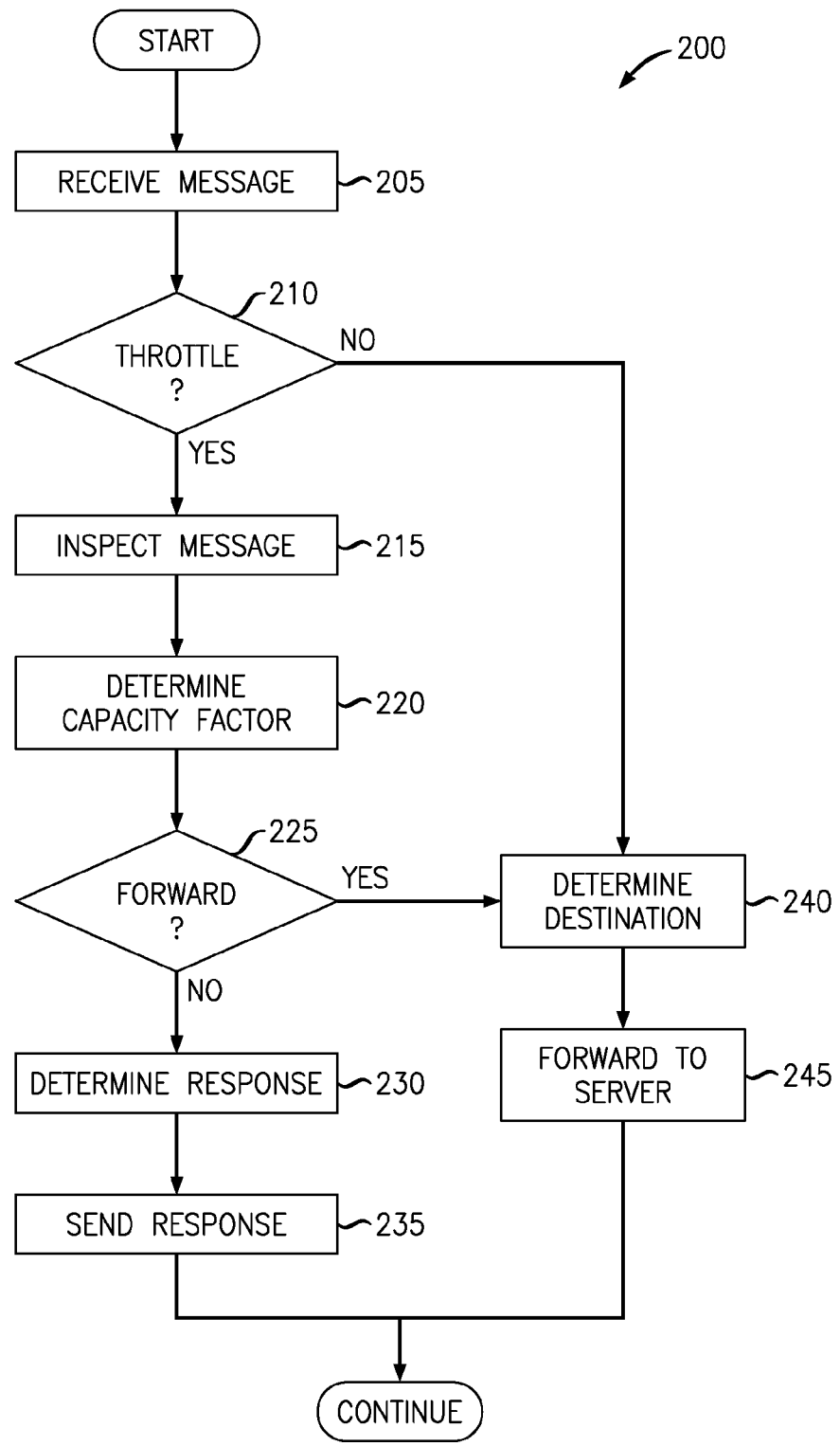
FIG. 2 is a flow diagram illustrating a method of traffic regulation according to an embodiment of the present invention.

FIG. 2 is a flow diagram illustrating a method 200 of traffic regulation according to an embodiment of the present invention. At START, it is presumed that the components necessary to performing this embodiment of the present invention are available and operational. The process then begins with the receipt of a message (step 205) in a traffic regulation device. The traffic regulation device may be, for example, part of a traffic and load regulation system operating according to a TR-069 protocol. When the message is received, a determination is made as to whether it is a throttled message type (step 210). As used herein, a throttled message type message is one that is regulated according to an embodiment an embodiment of the current invention. This step is omitted n some alternate embodiments, but in the embodiment of FIG. 2 if a message is not a throttled message type, it is simply forwarded to its intended destination.

In this embodiment, if the message is determined to be a throttled message type, then it is inspected to determine its subtype (step 215). The subtype may be, for one example, a Connection Request Inform message (see FIG. 3). The current capacity factor is then determined (step 220). In this embodiment, the current capacity factor is determined by reading a current capacity factor register where the value is maintained. As mentioned above, he capacity factor is an indication of the percentage of maximum capacity at which the system is currently operating. The maximum capacity of the system may be preset by the system operator, or may be determined dynamically. The capacity factor is preferably determined frequently on a fixed periodic schedule. In this embodiment, the capacity factor register updated each time a calculation is made. In an alternate embodiment, the capacity factor may be determined according to another scheme, for example each time a throttled message type is inspected, or alternately only when some indication of heavy traffic is received.

In the embodiment of FIG. 2, a determination is then made (step 225) whether to forward or decline the message. In this embodiment, the message subtype is compared to a set of rules to determine the limit that is to apply to the message, then to the current capacity factor to determine whether the limit for the relevant subtype has been exceeded. If not, the destination of the message is determined (step 240), and the message is routed to the destination (step 245). Note that in most embodiments the destination determination and forwarding will be performed according to the then-current protocols. Determining the destination may include an assessment of the current traffic load distribution in respect of the available servers.

In this embodiment, if the determination is made at step 225 that the message should be declined, then a determination is made as to which response should be sent (step 230). In accordance with the present invention, the options available for the response include indicating to the CPE that it must retry sending at a later time. This later time may be when the response is received in the CPE, or a delay period may be specified. A contingent event may also be specified, such as indicating that the CPE should retry sending only after receiving a subsequent message from the traffic regulation device. The response may also indicate that the message should not be resent and the CPE should merely return to its normal periodic maintenance cycle. The response determination may by a function of the type and subtype of message being declined. It may also take into account the current traffic load on the system.

When the appropriate response has been determined, the response message is sent (step 235) to the CPE. The process then continues as other messages are received in the traffic regulation device. Note that in some embodiments, a status message may be sent (not shown in FIG. 2) to some or all CPEs under management indicating that the reason for declining a previous message or messages has been mitigated or alleviated. The status message may also specify a new schedule or frequency for certain types of messages from the CPE.

Note that the sequence of operations in FIG. 2 is an exemplary embodiment, and variation is possible within the spirit of the invention. For example, additional operation may be added, and in some cases operations shown may be omitted. In addition, the operations of processes according to the present invention may be performed in any logically consistent order unless specified otherwise in a particular embodiment.

Figure 3:
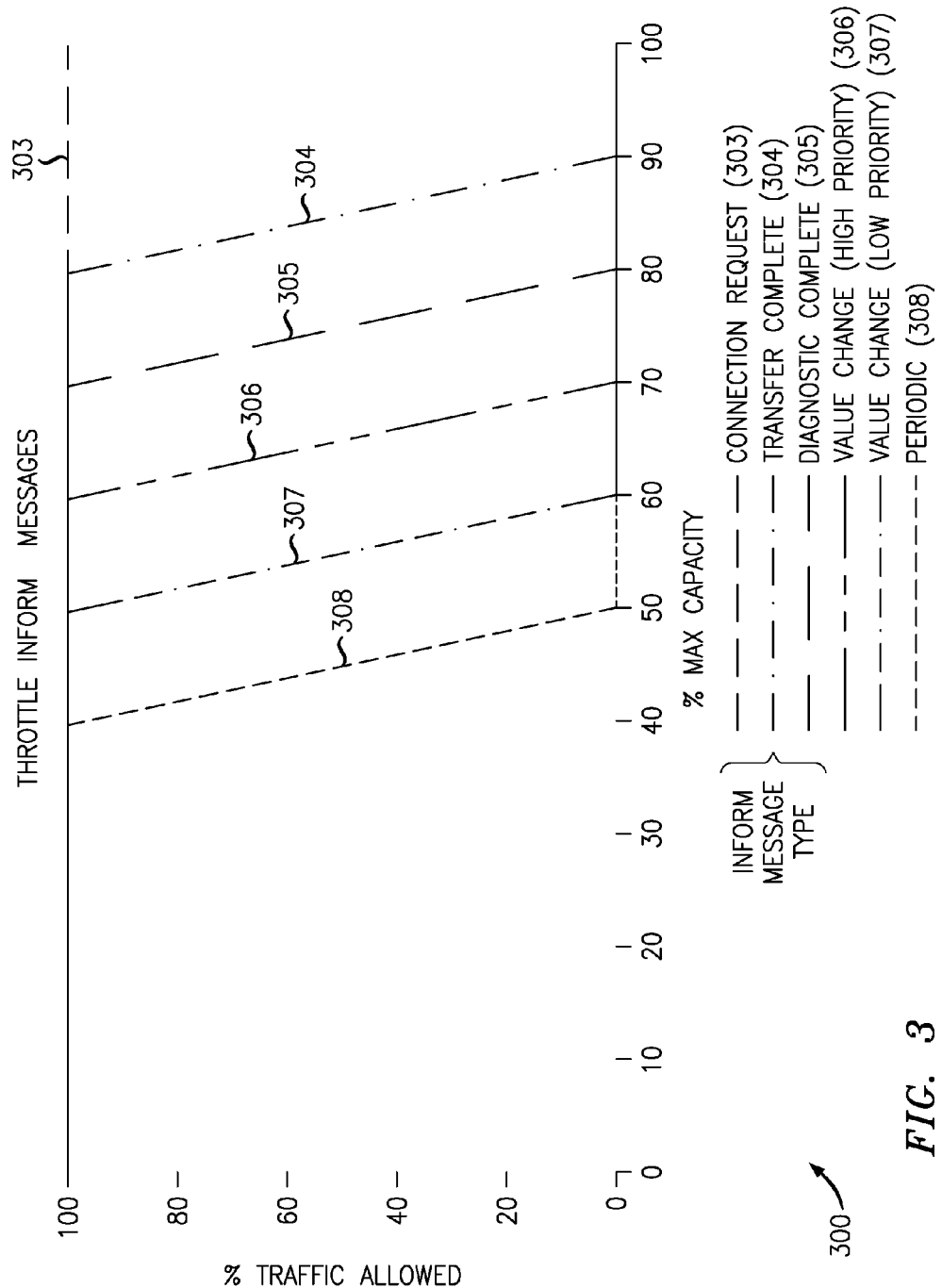
FIG. 3 is a graph illustrating rules for determining whether to route incoming messages according to an embodiment of the present invention.

FIG. 3 is a graph 300 illustrating rules for determining whether to route incoming messages according to an embodiment of the present invention. In this embodiment, the traffic regulator is used to throttle Inform messages from CPEs in a system operating according to a TR-069 (Broadband Forum) protocol. The rules illustrated in graph 300 apply to the various types of Inform messages recited below the horizontal axis, specifically:
Connection Request (303)
Transfer Complete (304)
Diagnostics Complete (305)
Value Change (high priority)(306)
Value Change (low priority)(307)
Periodic (308)
Note this listing is intended to be exemplary and not limiting, and of course the names or labels of the message types are subject to change. There is no requirement that all types of inform messages be subject to throttling in this way. In addition, it should be apparent that other types of messages could be managed in similar fashion. Finally, note that the rules defined in graph 300 are for this embodiment only, and in other embodiments, the shape of the curves, their slope, and the relative values may e different. Naturally, the fact that none of the curves completely coincide in FIG. 3 does not mean that this might not occur in other embodiments.

In this embodiment, the horizontal axis represents the fraction or percent of maximum capacity at which the system is currently operating. As mentioned above, this percentage may be continuously or periodically determined based on current traffic conditions, and the maximum capacity itself could be calculated by the system or imposed by the system administrator.

As can be seen in FIG. 3, different types of broken lines are used to differentiate between the curves, as indicated in the legend under the horizontal axis. The solid lines indicate the coincidence of two or more lines. The rules defined in this graph should be apparent with a short description. Initially, it is noted that certain types of Inform messages are addressed, but similar rules could be defined for other messages as well. Consistent the above description, Inform messages are considered in this embodiment a throttle message type, and are therefore inspected to determine the subtype. Regulating Inform messages according to the present invention is expected to produce advantageous results in most implementations but no specific result is required absent an explicit recitation in a particular embodiment.

In this embodiment, if a received message is an Inform message, the appropriate rule is applied according to its subtype. As can be seen in FIG. 3, for example, all messages are forwarded until the system is at 40% of maximum capacity. Above that, at least a portion of the Periodic Inform messages (308) received in the traffic regulation device is declined. If the system reaches 45% of maximum capacity, one-half of the Periodic Inform messages will be declined; at 50% of maximum, they all are. In comparison, no Transfer Complete messages (304) are declined until the traffic load reaches 80% of capacity, and Connection Request Inform messages (303) are never declined. It should be noted, however, that these rules are exemplary and may vary from one implementation to another.

As mentioned above, the manner in which messages are declined may vary as well, and in a given implementation they may be declined in different ways according to the type of message being declined, traffic conditions, operator-imposed rules, or other factors. In some cases they may simply discarded without notice, though some messages may also be buffered for later processing. In many implementations, however, a response will be generated and sent to the CPE when a message is declined.

Figure 4:
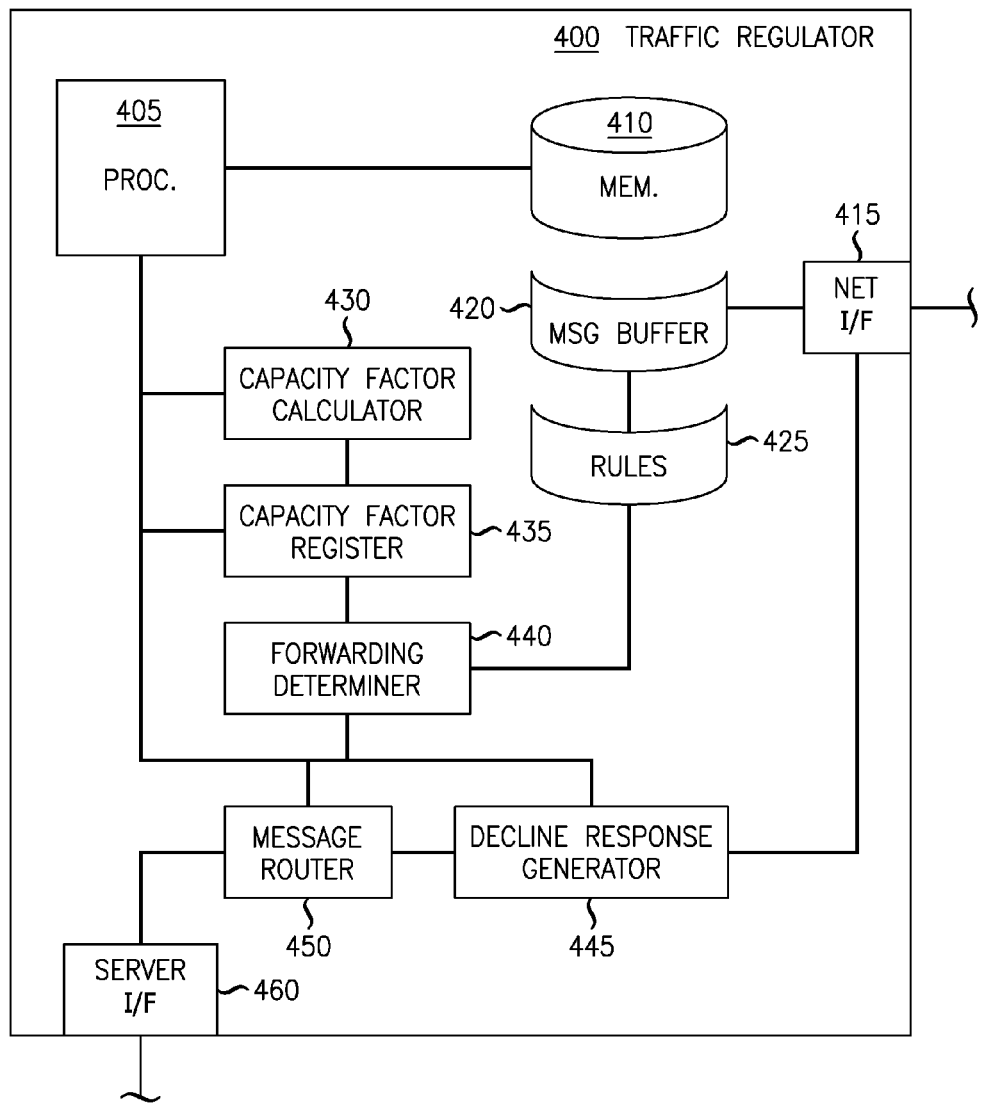
FIG. 4 is a simplified block diagram illustrating selected components of a traffic regulation device according to an embodiment of the present invention.

FIG. 4 is a simplified block diagram illustrating selected components of a traffic regulation device 400 according to an embodiment of the present invention. In this embodiment, the device includes a processor 405 for controlling the other components and executing software applications and a memory device 410 for storing software instructions and data. As used herein, a memory device is a physical storage component and not a transitory signal or other phenomenon. Operations of the memory device, however, may themselves be controlled by software instructions stored on it or another memory device.

In the embodiment of FIG. 4, the traffic regulation device (or simply "traffic regulator") includes a network interface 415 for, among other things, communicating with CPEs that are being managed by a management system. Messages, or certain types of messages may then be buffered in separately-shown message buffer 425. A rules database 425 stores information related to the rules established for handling incoming messages. A capacity factor register 435 is present for storing a capacity factor, the percentage of maximum traffic capacity at which the system is current operating as determined by capacity factor determiner 430.

In this embodiment, a forwarding determiner 440 evaluates the type or sub-type of an incoming message stored in the message buffer 420 against the rules stored in rules database 425 in light of the current capacity register. Based on this evaluation, forwarding determiner 440 determines whether the message should be forwarded or declined. Forwarded messages may be passed to message router 450 for sending to an appropriate server via server interface 470. If the message is not to be forwarded, decline response message generator generates a decline message based as determined by the forwarding determiner 440. The decline message is sent to the relevant CPE via network interface 415. In some embodiments, instead of or in addition to sending a decline message, the message may be stored in the message buffer 420 for processing at a later time.

Note that the components illustrated in FIG. 4 are exemplary; in other embodiments, some may be combined with others or further separated. Each of the components is embodied in hardware or in software executed on a hardware platform.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of regulating traffic in a subscriber device management system, comprising:
    receiving a management message from a subscriber device;
    inspecting the management message to determine at least one characteristic;
    determining whether to forward the management message based at least in part on the at least one characteristic; and
    forwarding the management message if it is determined that the message is to be forwarded.

2. The method of claim 1, further comprising storing the message in a buffer for later reconsideration if it is determined that the management message is not to be forwarded.

3. The method of claim 1, further comprising declining the management message if it is determined that the message is not to be forwarded.

4. The method of claim 3, further comprising sending a response to the subscriber device indicting that the management message has been declined.

5. The method of claim 4, further comprising generating the response according to the at least on characteristic of the management message.

6. The method of claim 5, wherein the at least one characteristic is the type of management message received.

7. The method of claim 1, further comprising determining a capacity factor, and wherein determining whether to forward the management message is based at least in part on the capacity factor.

8. The method of claim 7, wherein determining the capacity factor comprises querying a memory device where a previously-calculated capacity factor has been stored.

9. The method of claim 8, further comprising calculating the capacity factor and storing it in a memory device.

10. The method of claim 9, wherein the capacity factor is calculated and stored periodically.

11. The method of claim 10, further comprising forwarding all received management messages if the calculated capacity factor is below a threshold value.

12. A traffic regulation device, comprising:
    a processor,
    a memory device accessible to the processor;
    a forwarding determiner for inspecting a received management message and determining whether the received management message is to be forwarded; and
    a rules database for maintaining rules used by the forwarding determiner to determine whether the received management message is to be forwarded.

13. The traffic regulation device of claim 12, further comprising a capacity factor calculator for calculating a capacity factor, wherein the forwarding determiner determines whether a received management message is to be forwarded based at least in part on the capacity factor.

14. The traffic regulation device of claim 12, further comprising a buffer for storing a management message for later reconsideration if it is determined that the management message is not to be forwarded.

15. The traffic regulation device of claim 12, further comprising a response message generator for generating a response message for informing the subscriber device that the management message has been declined.

\* \* \* \* \*